United States Patent
Nagao

(10) Patent No.: US 8,818,279 B2
(45) Date of Patent: Aug. 26, 2014

(54) COMMUNICATION DEVICE AND METHOD FOR CONTROLLING COMMUNICATION DEVICE

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 219 days.

(21) Appl. No.: 13/599,154

(22) Filed: Aug. 30, 2012

(65) Prior Publication Data

US 2013/0065528 A1 Mar. 14, 2013

(30) Foreign Application Priority Data

Sep. 9, 2011 (JP) ................................ 2011-197337
Dec. 20, 2011 (JP) ................................ 2011-278460

(51) Int. Cl.
*H04B 7/00* (2006.01)
*H04B 1/38* (2006.01)
*H04M 1/00* (2006.01)
*H04M 1/725* (2006.01)
*H04W 52/02* (2009.01)

(52) U.S. Cl.
CPC ...... *H04W 52/0277* (2013.01); *H04W 52/0261* (2013.01); *H04M 1/72527* (2013.01)
USPC ............................ 455/41.2; 455/557; 455/572

(58) Field of Classification Search
USPC ....................... 455/41.2, 552.1, 557, 572, 573
See application file for complete search history.

(56) References Cited

U.S. PATENT DOCUMENTS

| | | | |
|---|---|---|---|
| 7,164,887 B2 * | 1/2007 | Tanada et al. | 455/41.2 |
| 7,221,961 B1 * | 5/2007 | Fukumoto et al. | 455/557 |
| 8,325,710 B2 * | 12/2012 | Emmanuel | 455/572 |
| 8,718,706 B2 * | 5/2014 | Griffin et al. | 455/552.1 |
| 2004/0249625 A1 | 12/2004 | Leaming | |
| 2008/0250485 A1 | 10/2008 | Schreyer et al. | |
| 2011/0080343 A1 | 4/2011 | Nguyen et al. | |

FOREIGN PATENT DOCUMENTS

| | | |
|---|---|---|
| JP | 2004-362588 | 12/2004 |
| JP | 2007-528057 | 10/2007 |
| JP | 2009-064118 | 3/2009 |
| JP | 2010-061670 | 3/2010 |
| JP | 2011-081805 | 4/2011 |

OTHER PUBLICATIONS

Patent Abstracts of Japan, Publication No. 2011-081805, Published Apr. 21, 2011.

(Continued)

*Primary Examiner* — Quochien B Vuong
(74) *Attorney, Agent, or Firm* — Staas & Halsey LLP

(57) ABSTRACT

A communication device including: a setting portion that sets the communication device as a main device when communication device is connected to another device and receives an electric power from an external power supply, and sets communication device as a client device when communication device is connected to another device and receives an electric power from another device; an update portion that transmits first and second identifiers to another device, receives from another device third and fourth identifiers, forms a network to which communication device and another device belong with second identifier when communication device is set as the main device, and updates second identifier with fourth identifier when communication device is set as the client device; and a wireless communication portion that, when another device is disconnected from communication device, communicates wirelessly with another device with first and third identifiers, and any one of second and fourth identifiers.

14 Claims, 18 Drawing Sheets

(56) References Cited

OTHER PUBLICATIONS

Patent Abstracts of Japan, Publication No. 2004-362588, Published Dec. 24, 2004.
Patent Abstracts of Japan, Publication No. 2010-061670, Published Mar. 18, 2010.
Patent Abstracts of Japan, Publication No. 2009-064118, Published Mar. 26, 2009.

* cited by examiner

FIG. 3A
FIG. 3B
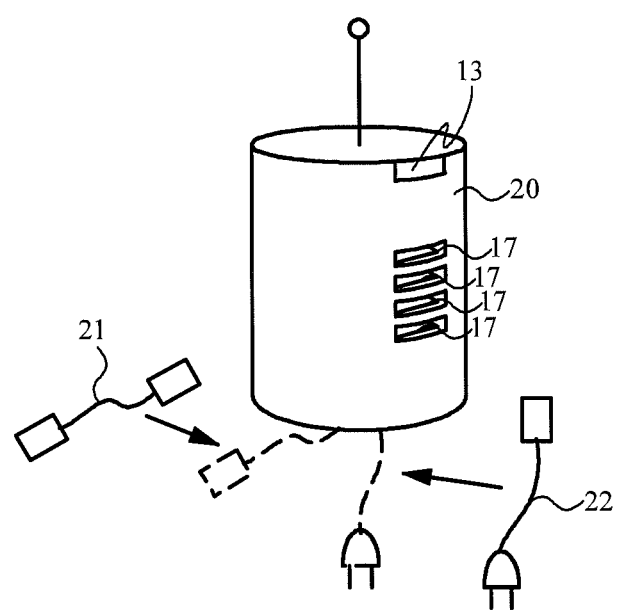
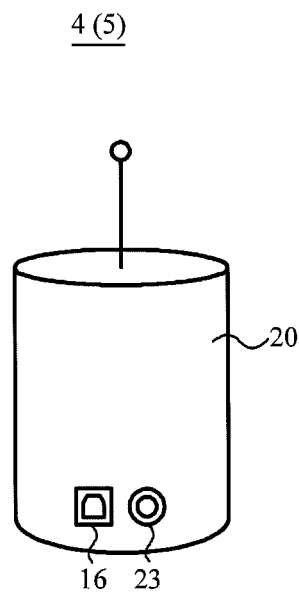

FIG. 6

| | TYPE OF POWER SUPPLY | STATE OF DONGLE | LED13A (RED) | LED13B (GREEN) | LIGHT EMITTING COLOR |
|---|---|---|---|---|---|
| | NO | — | OFF | OFF | — |
| ENABLE COMMUNI-CATION | USB | MAIN DEVICE | ON | ON | ORANGE |
| | AC | CLIENT DEVICE | OFF | ON | GREEN |
| DISENABLE COMMUNI-CATION | USB | MAIN DEVICE | ON | OFF | RED |
| | AC | CLIENT DEVICE | ON | OFF | RED |

FIG. 7

| | TYPE OF POWER SUPPLY | STATE OF DONGLE | LED13A (RED) | LED13B (GREEN) | LIGHT EMITTING COLOR |
|---|---|---|---|---|---|
| | NO | — | OFF | — | — |
| ENABLE COMMUNI-CATION | USB | MAIN DEVICE | 1 SECOND INTERVAL | — | RED |
| | AC | CLIENT DEVICE | 3 SECOND INTERVAL | — | RED |
| DISENABLE COMMUNI-CATION | USB | MAIN DEVICE | 0.1 SECOND INTERVAL | — | RED |
| | AC | CLIENT DEVICE | 0.1 SECOND INTERVAL | — | RED |

COMMUNICATION DEVICE AND METHOD FOR CONTROLLING COMMUNICATION DEVICE

CROSS-REFERENCE TO RELATED APPLICATION

This application is based upon and claims the benefit of priority of the prior Japanese Patent Application No. 2011-197337, filed on Sep. 9, 2011 and the prior Japanese Patent Application No. 2011-278460, filed on Dec. 20, 2011, the entire contents of which are incorporated herein by reference.

FIELD

A certain aspect of the embodiments discussed herein is related to a communication device and a method for controlling the communication device.

BACKGROUND

Conventionally, there has been known a wireless mouse that performs short-range wireless communication with a computer (e.g. see Japanese Laid-Open Patent Application Publication No. 2011-81805). There has been known a dongle to be used when a guest device is connected to a wireless home network (e.g. see Japanese National Publication of International Patent Application No. 2007-528057).

In addition, there has been known a system in which a main device communicates wirelessly with a client device. In this system, an identification number of the client device is ordinarily preset to the main device, and an identification number of main device is ordinarily preset to the client device. Thereby, the main device communicates wirelessly with only the client device of the preset identification number, and the client device communicates wirelessly with only the main device of the preset identification number. As a result, the main device and the client device do not interfere with a device of an unset identification number.

SUMMARY

According to an aspect of the present invention, there is provided a communication device including: a storage that stores first identification information for identifying a communication device and second identification information for identifying a network to which the communication device belongs; a connection portion that connects with another communication device by a cable; a first setting portion that sets the communication device as a main device when the communication device is connected to the another communication device and receives an electric power from a first external power supply, and sets the communication device as a client device when the communication device is connected to the another communication device and receives an electric power from the another communication device; an update portion that transmits the first identification information and the second identification information to the another communication device, receives from the another communication device third identification information for identifying the another communication device and fourth identification information for identifying a network to which the another communication device belongs, forms a network to which the communication device and the another communication device belong with the second identification information when the communication device is set as the main device, and updates the second identification information with the received fourth identification information when the communication device is set as the client device; and a wireless communication portion that, when the another communication device is disconnected from the communication device, communicates wirelessly with the another communication device with the first identification information, the third identification information and any one of the second identification information and the fourth identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a perspective view illustrating the exterior appearance of a dongle (i.e., the main device 4 or a client device 5);

FIG. 3B is a view illustrating a back surface of the dongle (i.e., the main device 4 or the client device 5);

FIG. 6 is a diagram illustrating a relationship between a type of a power supply, a state of the dongle, control states of LEDs 13A and 13B, and a light emitting color;

FIG. 7 is a diagram illustrating a variation example of the relationship between the type of the power supply, the state of the dongle, the control states of the LEDs 13A and 13B, and the light emitting color;

DESCRIPTION OF EMBODIMENTS

A description will now be given of an exemplary embodiment with reference to the accompanying drawings.

Figure 1:
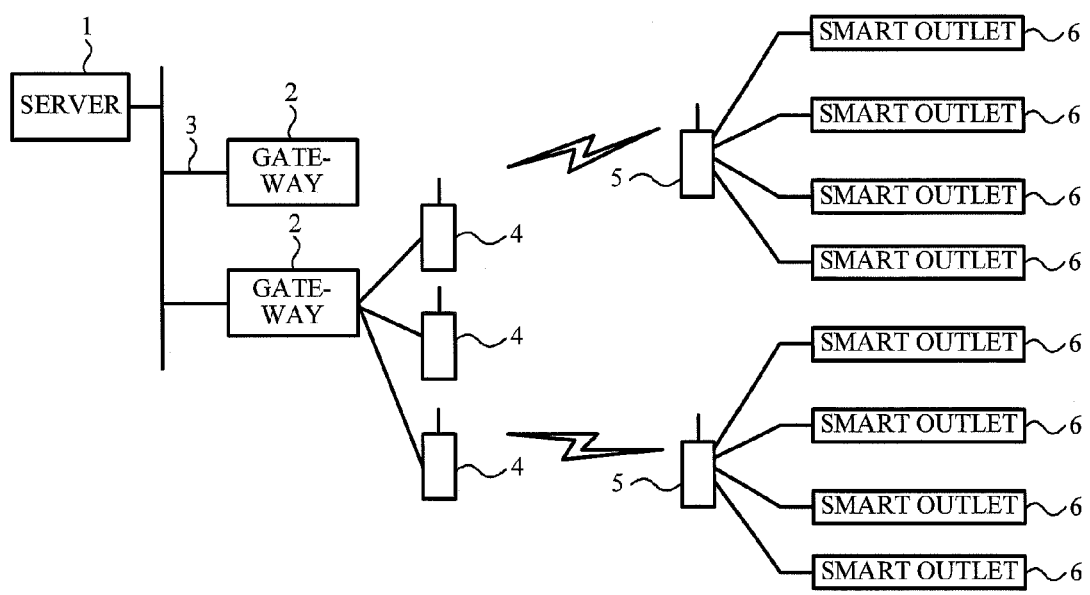
FIG. 1 is a diagram illustrating the configuration of a system including a communication device according to a first embodiment.

(First Embodiment) FIG. 1 is a diagram illustrating the configuration of a system including a communication device according to a first embodiment.

In FIG. 1, a system 10 includes a server 1, a plurality of gateways 2, a plurality of main devices 4, a plurality of client devices 5, and a plurality of smart outlets 6. Each of the main devices 4 and the client devices 5 is a communication device called a dongle. The dongle does not construct a pairing relationship between the main device and the client device in a state where a power supply is not turned on. That is, the communication device according to the present embodiment is a dongle which can be any one of the main device and the client device before the power supply is turned on. A setting method of the main device and the client device is described later. Here, the numbers of servers 1, gateways 2, main devices 4, client devices 5 and smart outlets 6 are not limited to those of FIG. 1.

The server 1 is connected to the gateways 2 via a local area network (LAN) 3, and manages the operation of the gateways 2. Each gateway 2 saves data on electric power consumption of each smart outlet 6. Each main device 4 is connected to the gateway 2, and communicates wirelessly with the client device 5 of the pairing relationship.

Each client device 5 is connected to the smart outlets 6, and communicates wirelessly with the main device 4 of the pairing relationship. Thereby, the data on the electric power consumption of each smart outlet 6 is transmitted to the gateway 2 via the main device 4 and the client device 5. The smart outlet 6 includes a power sensor, and can measure electric power consumption of a connected device.

Figure 2:
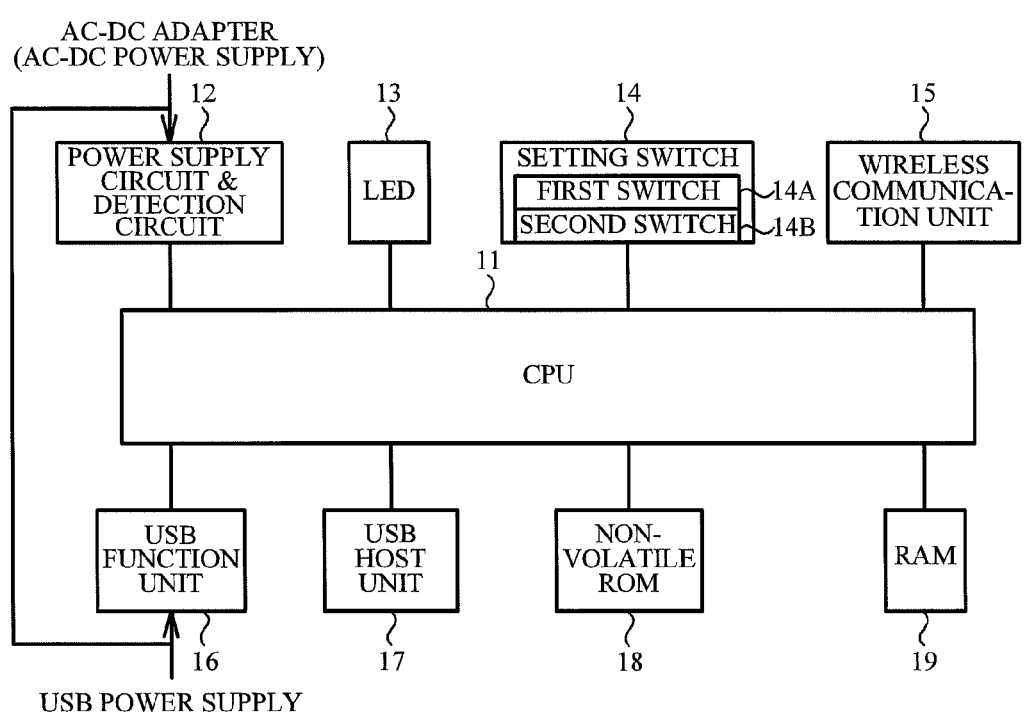
FIG. 2 is a block diagram illustrating the configuration of a main device 4.

FIG. 2 is a block diagram illustrating the configuration of a main device 4. Since the configuration of the client device 5 is the same as that of the main device 4, a description thereof is omitted.

The main device 4 includes: a CPU (Central Processing Unit) 11 (a first setting portion, an update portion, and a second setting portion); a power supply circuit & detection circuit 12; a LED (Light Emitting Diode) 13 (a light emitting portion); a setting switch 14; a wireless communication unit 15 (a wireless communication portion); a USB (Universal Serial Bus) function unit 16; a USB host unit 17 (a connection portion); a non-volatile ROM (Read Only Memory) 18 (a storage portion); and a RAM (Random Access Memory) 19.

The CPU 11 controls the whole operation of the main device 4. The power supply circuit & detection circuit 12 is a circuit for supplying an electric power to the CPU 11 and a circuit used in order that the CPU 11 detects a destination of the electric power supply. The LED 13 is provided on a housing of the main device 4. The LED 13 notifies a worker whether the dongle is the main device or the client device by a lighting color, a blinking pattern or the like. The setting switch 14 is a switch used for various settings. The setting switch 14 includes: a first switch 14A that sets an operation mode of the dongle as a main device mode or a client device mode; and a second switch 14B that sets any one of a power supply precedence mode in which the operation mode of the dongle is set depending on a type of an operating power supply and a switch precedence mode in which the operation mode of the dongle is set depending on the setting of the first switch 14A. The wireless communication unit 15 communicates wirelessly with the client device 5. For example, when the wireless communication unit 15 performs short-range wireless communication prescribed by IEEE802.15.4, the wireless communication unit 15 includes a wireless unit of 2.4 GHz, a PHY unit that performs a process based on a PHY layer of IEEE802.15.4, and a MAC unit that handles all the MAC commands of IEEE802.15.4. Moreover, the wireless communication unit 15 calculates a value (x) of radio wave sensitivity by dividing the intensity of a radio wave received from another dongle by a maximum value of the intensity of the radio wave, and transmits the value (x) of the radio wave sensitivity to the CPU 11.

The USB function unit 16 is used when the power supply is received from a USB device or the pairing relationship between the main device and the client device is constructed. The USB function unit 16 is a USB terminal of a type B, for example. The USB host unit 17 is used when the pairing relationship between the main device and the client device is constructed or the smart outlet 6 is connected. The USB host unit 17 is a USB terminal of a type A, for example.

The non-volatile ROM 18 stores a program for controlling the operation of the main device 4, main device information and client device information. The main device information includes main device identification information for identifying the main device 4, and network identification information for identifying a network to which the main device 4 belongs. The client device information includes client device identification information for identifying the client device 5 connected to the main device 4, and network identification information for identifying a network to which the client device 5 belongs. The main device identification information and the client device identification information are unique values, respectively. For example, when the main device 4 and the client device 5 perform short-range wireless communication prescribed by IEEE802.15.4, the main device information is an address of the main device 4 (corresponding to the main device identification information) and a PAN (Personal Area Network) ID (corresponding to the network identification information), and the client device information is an address of the client device 5 (corresponding to the client device identification information) and a PAN ID (corresponding to the network identification information). When the main device information or the client device information is changed, the CPU 11 stores a time stamp specifying the changed time and day into the non-volatile ROM 18. The RAM 19 functions as a working area.

FIG. 3A is a perspective view illustrating the exterior appearance of the dongle (i.e., the main device 4 or the client device 5). FIG. 3B is a view illustrating a back surface of the dongle (i.e., the main device 4 or the client device 5).

As illustrated in FIG. 3A, the dongle has a plurality of USB host units 17 on a side surface of a housing 20, and the LED 13 on an upper portion of the side surface of the housing 20. As illustrated in FIG. 3B, the back surface of the dongle has the USB function unit 16 and a DC input terminal 23. Here, the numbers of USB host units 17 and USB function units 16 are not limited to those of FIGS. 3A and 3B.

As illustrated in FIG. 3A, the dongle can connect a USB cable 21 and/or an AC-DC adapter cable 22. When the USB cable 21 is connected to the USB function unit 16 of FIG. 3B, the dongle receives the power supply from a USB device, not shown. The USB device may be any suitable device with a USB terminal. The USB device may be the gateway 2 of FIG. 1 or a computer. When the AC-DC adapter cable 22 is connected to the DC input terminal 23 of FIG. 3B, the dongle receives the power supply from an AC power supply via an AC-DC adapter.

The dongle does not become the main device 4 and the client device 5 before the power supply is turned on. However, when the USB cable 21 is connected to the USB function unit 16 of FIG. 3B and the dongle receives the power supply from the USB device, not shown, the CPU 11 recognizes the operation mode as the main device mode, i.e., the CPU 11 recognizes the dongle as the main device 4. On the contrary, when the AC-DC adapter cable 22 is connected to the DC input terminal 23 of FIG. 3B and the dongle receives the power supply from the AC-DC adapter, the CPU 11 recognizes the operation mode as the client device mode, i.e., the CPU 11 recognizes the dongle as the client device 5. Thus, the CPU 11 decides the operation mode of the dongle as any one of the main device mode and the client device mode according to a type of the operating power supply of the dongle. Thereby, when the worker looks at a cable connected to the dongle, the worker can determine whether the dongle is the main device 4 or the client device 5.

Figure 4:
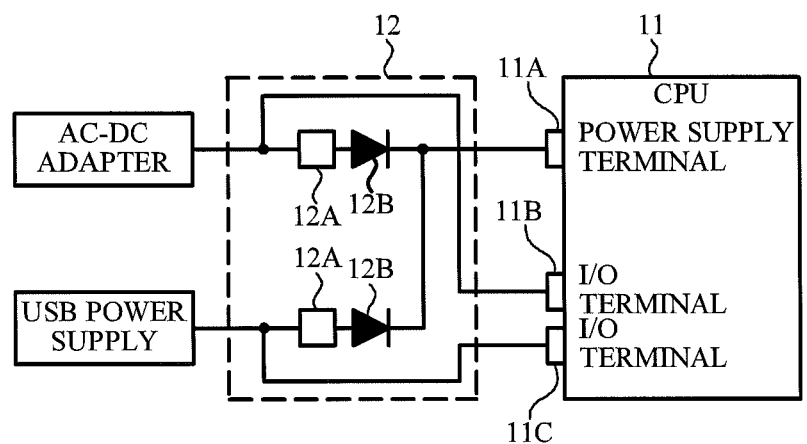
FIG. 4 is a diagram illustrating the schematic configuration of a power supply circuit & detection circuit 12.

FIG. 4 is a diagram illustrating the schematic configuration of the power supply circuit & detection circuit 12.

As illustrated in FIG. 4, the power supply circuit & detection circuit 12 includes a voltage converting element 12A, and a diode 12B for preventing the adverse current of a current. The electric power from the AC-DC adapter and the electric power from a USB power supply (i.e., the electric power from the USB device) are supplied to a power supply terminal 11A of the CPU 11 via the voltage converting element 12A. On the other hand, the electric power from the AC-DC adapter and the electric power from the USB power supply are supplied to an I/O terminal 11B and an I/O terminal 11C of the CPU 11, respectively.

Thereby, the CPU 11 can determine the type of the operating power supply of the dongle according to the input of the I/O terminal 11B and the I/O terminal 11C. As a result, the CPU 11 can decide the operation mode of the dongle as any one of the main device mode and the client device mode according to the type of the operating power supply of the dongle, as described above. Here, when the power supply is received from both of the AC-DC adapter and the USB power supply, the CPU 11 decides a precedence operation mode in advance and recognizes the operation mode as the decided precedence operation mode. For example, when the dongle receives the power supply from both of the AC-DC adapter and the USB power supply, and the client device mode is given priority to over the main device mode, the CPU 11 recognizes the operation mode as the client device mode.

Figure 5A:
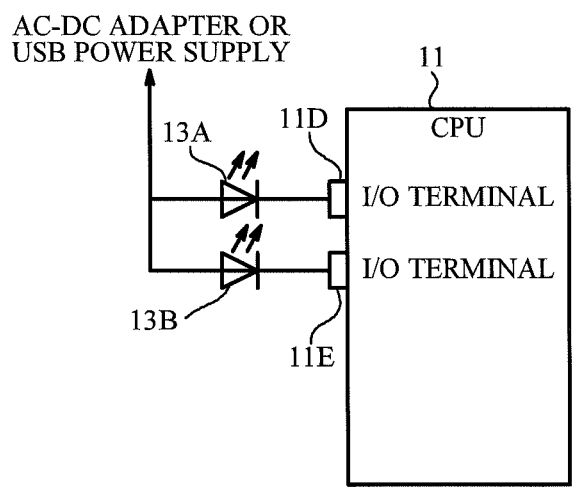
FIG. 5A is a diagram illustrating the schematic configuration of a CPU 11 and a LED 13.
Figure 5B:
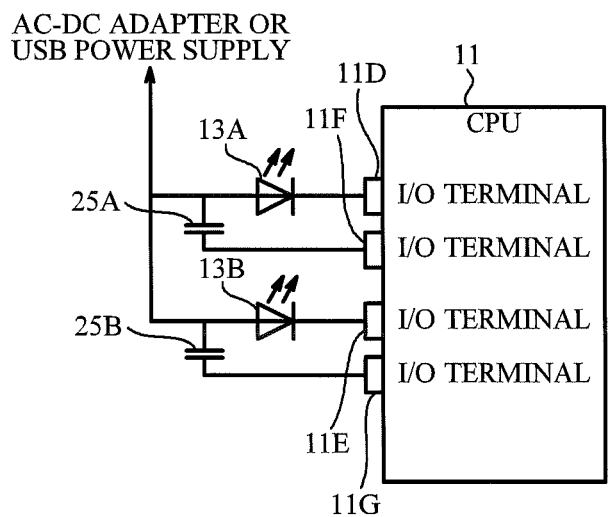
FIG. 5B is a diagram illustrating a variation example of the schematic configuration of the CPU 11 and the LED 13.

FIG. 5A is a diagram illustrating the schematic configuration of the CPU 11 and the LED 13. FIG. 5B is a diagram illustrating a variation example of the schematic configuration of the CPU 11 and the LED 13.

The LED 13 includes a LED 13A and a LED 13B emitting light with different colors, for example. The LED 13A emits light in red, and the LED 13B emits light in green. When the LED 13A and the LED 13B emit light simultaneously, it seems to the worker that the LED 13A and the LED 13B are emitting light in orange which is a mixed color of red and green. As illustrated in FIG. 5A, an I/O terminal 11D of the CPU 11 is connected to the LED 13A, and an I/O terminal 11E of the CPU 11 is connected to the LED 13B. In the case of FIG. 5A, the CPU 11 includes an automatic oscillation function of PWM (Pulse Width Modulation), for example. The CPU 11 can blink the LEDs 13A and 13B by switching output levels of the I/O terminals 11D and 11E at suitable timing by using the automatic oscillation function.

In the case of FIG. 5B, the CPU 11 includes I/O terminals 11F and 11G for controlling the blinking of the LEDs 13A and 13B in addition to the I/O terminals 11D and 11E for controlling the lighting of the LEDs 13A and 13B. A capacitor 25A is connected to the I/O terminal 11F, and a capacitor 25B is connected to the I/O terminal 11G. In this case, the blinking of the LED 13A can be controlled by charge and discharge of the capacitor 25A connected to the I/O terminal 11F. Similarly, the blinking of the LED 13B can be controlled by charge and discharge of the capacitor 25B connected to the I/O terminal 11G.

FIG. 6 is a diagram illustrating a relationship between a type of the power supply, a state of the dongle, control states of the LEDs 13A and 13B, and a light emitting color.

When the electric power is not supplied to the dongle as illustrated in FIG. 6, the CPU 11 turns off the LEDs 13A and 13B. When the electric power from the USB power supply is supplied to the dongle, the CPU 11 turns on the LEDs 13A and 13B. That is, when the dongle is the main device 4, the LEDs 13A and 13B emit light in orange which is the mixed color of red and green, as a whole. When the electric power from the AC-DC adapter is supplied to the dongle, the CPU 11 turns on the LED 13B. That is, when the dongle is the client device 5, the LED 13B emits light in green. Thereby, when the worker looks at the LED 13 of the dongle, the worker can determine whether the dongle is the main device 4 or the client device 5, and whether the dongle is operating. As described above, when the worker looks at a cable connected to the dongle, the worker can determine whether the dongle is the main device 4 or the client device 5. Therefore, there are two determination methods of the main device 4 or the client device 5.

When the CPU 11 cannot communicate with a communication partner, the CPU 11 turns on the LED 13A. That is, when the main device 4 cannot communicate with the client device 5, the LED 13A of the main device 4 emits light in red. On the contrary, when the client device 5 cannot communicate with the main device 4, the LED 13A of the client device 5 emits light in red. When the CPU 11 cannot communicate with the communication partner, the CPU 11 turns on the LED 13B or the LEDs 13A and 13B, as described above. That is, the LED 13 emits light in green or orange. Therefore, when the worker looks as the LED 13 of the dongle, the worker can determine a communication state of the dongle.

Here, the determination of the main device 4 or the client device 5 and the determination of the communication state of the dongle are performed based on the light emitting color of the LED 13. However, the determination of the main device 4 or the client device 5 and the determination of the communication state of the dongle may be performed based on blinking intervals of the LED 13. In this case, the blinking intervals (e.g. 1 second intervals) of the LED 13A when the dongle is the main device 4 is different from the blinking intervals (e.g. 3 second intervals) of the LED 13A when the dongle is the client device 5, as illustrated in FIG. 7. In addition, the blinking intervals (e.g. 1 second intervals or 3 second intervals) of the LED 13A when the dongle can communicate with the communication partner is different from the blinking intervals (e.g. 0.1 second intervals) of the LED 13A when the dongle cannot communicate with the communication partner.

Moreover, the determination of the main device 4 or the client device 5 and the determination of the communication state of the dongle may be performed based on a combination of the light emitting color of the LED 13 and blinking intervals of the LED 13. The light emitting color of the LED 13 is not limited to red and green. The number of LEDs included in the dongle is not limited to two.

Figure 8:
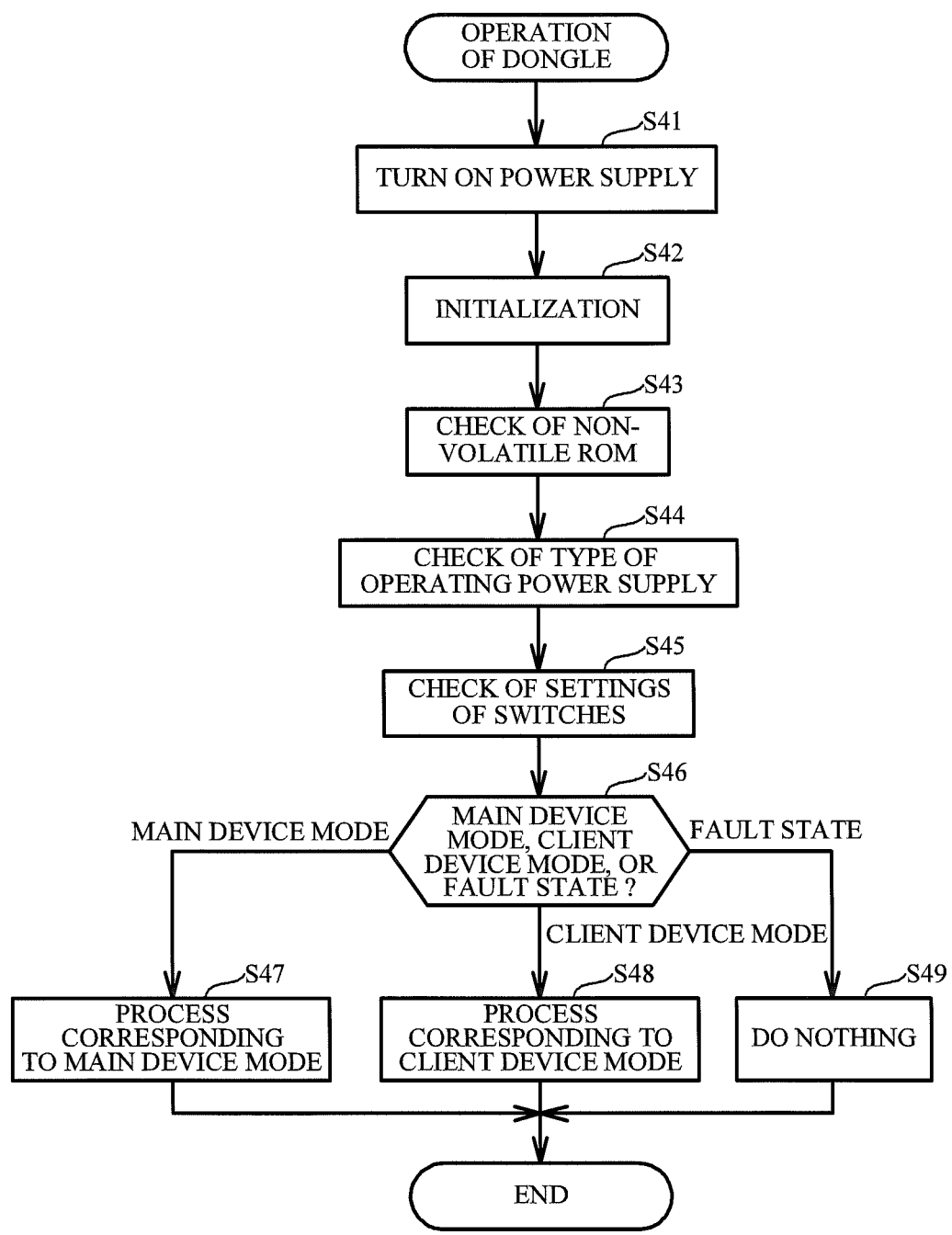
FIG. 8 is a flowchart illustrating the operation of the single dongle.

FIG. 8 is a flowchart illustrating the operation of the single dongle.

First, when the electric power is supplied from the AD-DC adapter or the USB power supply and the power supply of the dongle is turned on (step S41), the CPU 11 of the dongle performs initialization (step S42). Next, the CPU checks the non-volatile ROM 18 (step S43), checks a type of the operating power supply (step S44), and checks settings of the switches 14A and 14B (step S45). The CPU 11 determines whether the operation mode of the dongle is the main device mode, the client device mode, or a fault state (i.e., a fault state of wireless communication), based on the settings of the switches 14A and 14B and the type of the operating power supply (step S46). When the operation mode of the dongle is the main device mode, the CPU 11 performs a process corresponding to the main device mode described later (step S47). When the operation mode of the dongle is the client device mode, the CPU 11 performs a process corresponding to the client device mode described later (step S48). When the operation mode of the dongle is the fault state, the CPU 11 does nothing in particular (step S49).

Figure 9:
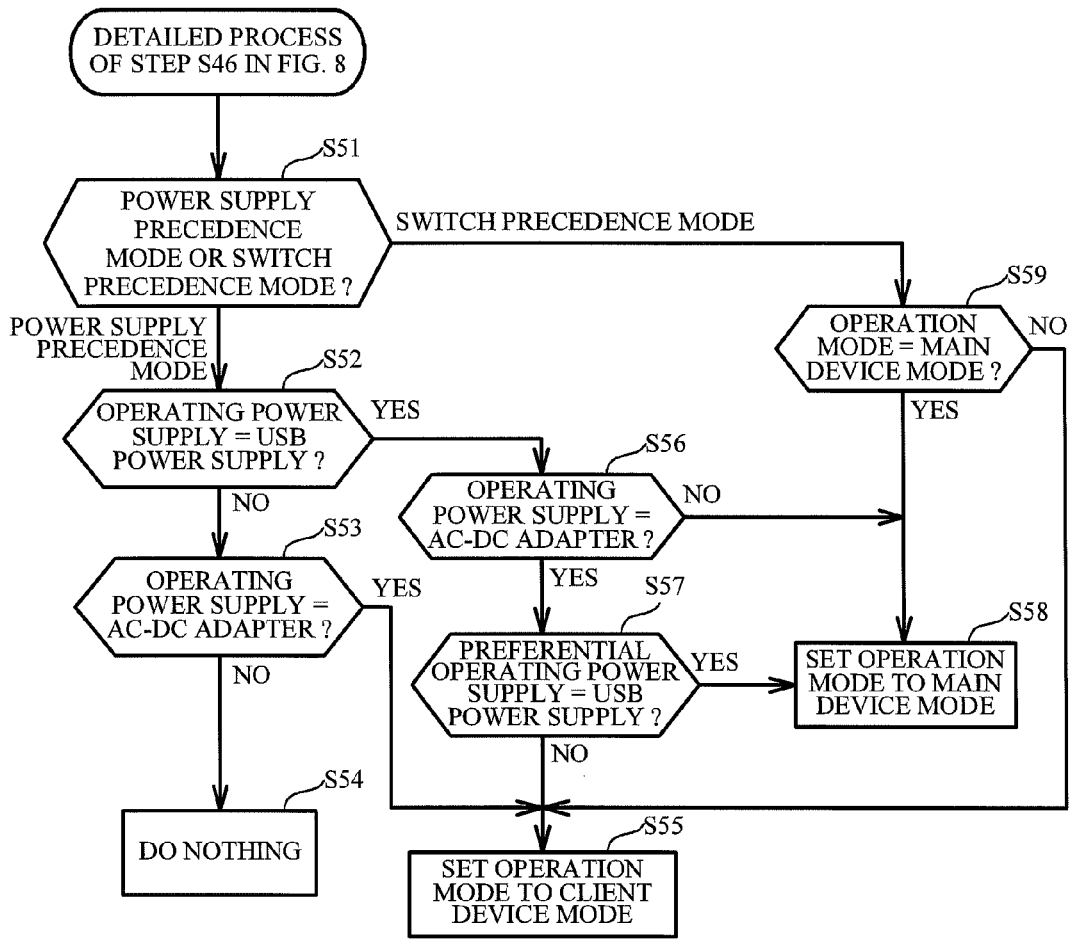
FIG. 9 is a flowchart illustrating a detailed process of step S46 in FIG. 8.

FIG. 9 is a flowchart illustrating a detailed process of step S46 in FIG. 8.

First, the CPU 11 determines whether the setting of the switch 14B is the power supply precedence mode or the switch precedence mode (step S51). When the setting of the switch 14B is the power supply precedence mode, the CPU 11 determines whether the operating power supply is the USB power supply (step S52). When the determination of step S52 is NO, the CPU 11 determines whether the operating power supply is the AC-DC adapter (step S53). When the determination of step S53 is NO, the operation mode is the fault state, and hence the CPU 11 does nothing, as described above (step S54). When the determination of step S53 is YES, the CPU 11 sets the operation mode to the client device mode (step S55).

When the above-mentioned determination of step S52 is YES, the CPU 11 determines whether the operating power supply is the AC-DC adapter (step S56). When the determination of step S56 is YES, the operating power supply is the AC-DC adapter and the USB power supply. When the operating power supply is the AC-DC adapter and the USB power supply, the CPU 11 decides a preferential operating power supply in advance. When the determination of step S56 is YES, the CPU 11 determines whether the preferential operating power supply is the USB power supply (step S57). When the determination of step S57 is YES, the CPU 11 sets the operation mode to the main device mode (step S58). On the other hand, when the determination of step S57 is NO, the CPU 11 sets the operation mode to the client device mode (step S55). When the determination of step S56 is NO, the CPU 11 sets the operation mode to the main device mode (step S58).

When the setting of the switch 14B is the switch precedence mode in step S51, the CPU 11 determines whether the operation mode is set to the main device mode by the switch 14A (step S59). When the determination of step S59 is YES, the CPU 11 sets the operation mode to the main device mode (step S58). On the other hand, when the determination of step S59 is NO, the CPU 11 sets the operation mode to the client device mode (step S55).

Figure 10:
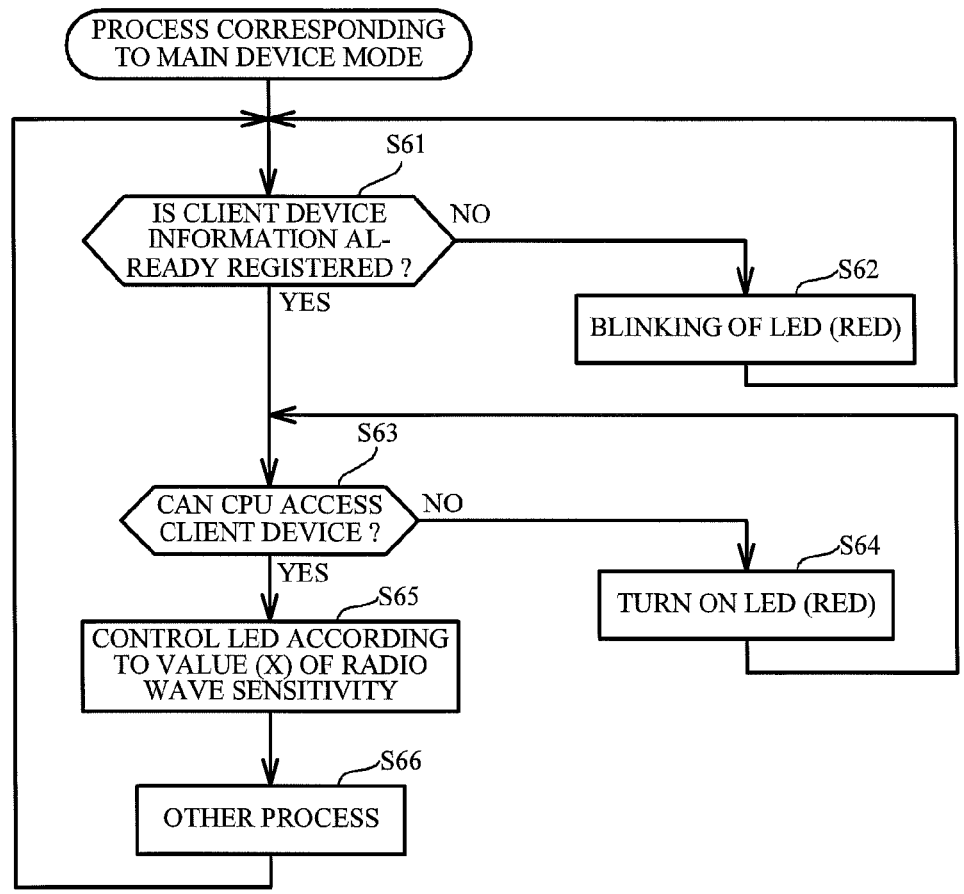
FIG. 10 is a flowchart illustrating a process corresponding to a main device mode.

FIG. 10 is a flowchart illustrating a process corresponding to the main device mode.

First, the CPU 11 determines whether the client device information is already registered into the non-volatile ROM 18 (step S61). When the determination of step S61 is NO, the CPU 11 blinks the LED 13A (red) (step S62). Then, the procedure returns to step S61. When the determination of step S61 is YES, the CPU 11 determines whether to be able to access the client device (step S63). When the determination of step S63 is NO, the CPU 11 turns on the LED 13A (red) (step S64). Then, the procedure returns to step S63. When the determination of step S63 is YES, the CPU 11 controls the operation of the LEDs 13A and 13B according to the value (x) of radio wave sensitivity of the wireless communication unit 15 (step S65). Here, the CPU 11 receives information on the value (x) of the radio wave sensitivity from the wireless communication unit 15. Next, the CPU 11 performs other process (step S66), and then the procedure returns to step S61.

Figure 11:
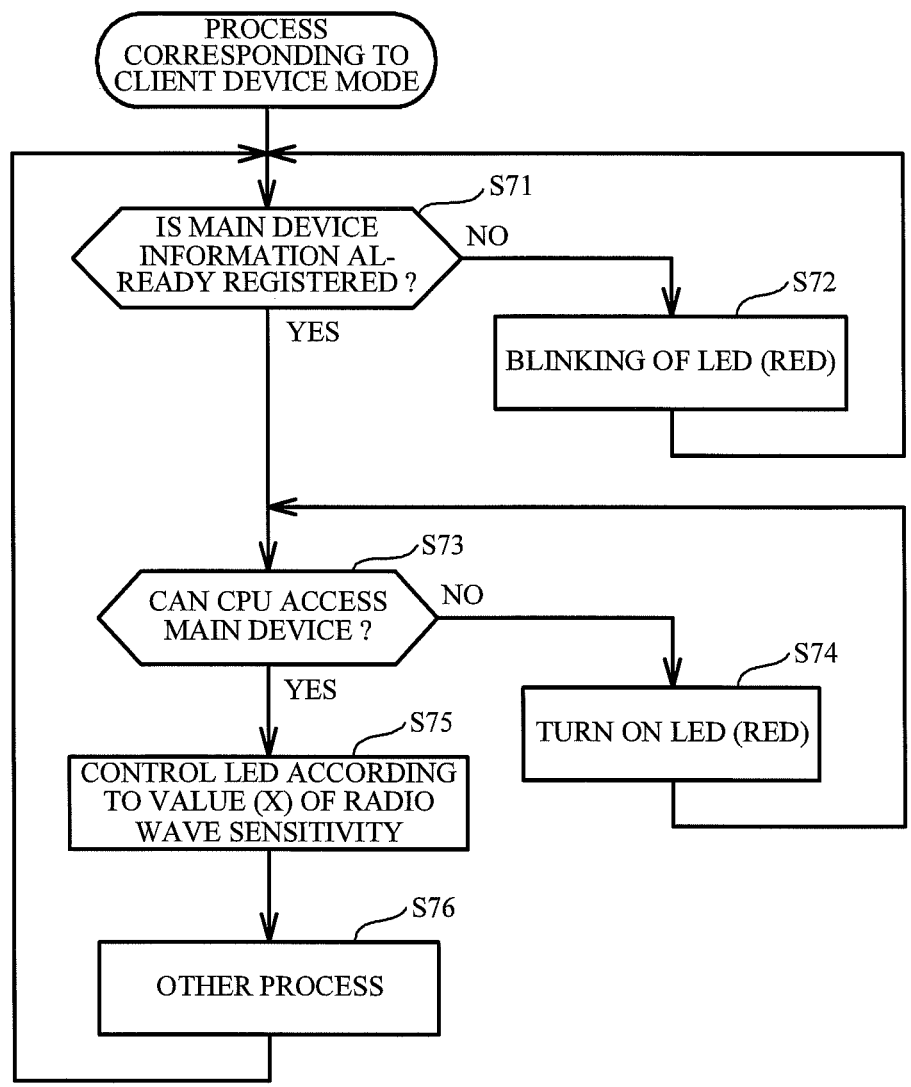
FIG. 11 is a flowchart illustrating a process corresponding to a client device mode.

FIG. 11 is a flowchart illustrating a process corresponding to the client device mode.

First, the CPU 11 determines whether the main device information is already registered into the non-volatile ROM 18 (step S71). When the determination of step S71 is NO, the CPU 11 blinks the LED 13A (red) (step S72). Then, the procedure returns to step S71. When the determination of step S71 is YES, the CPU 11 determines whether to be able to access the main device (step S73). When the determination of step S73 is NO, the CPU 11 turns on the LED 13A (red) (step S74). Then, the procedure returns to step S73. When the determination of step S73 is YES, the CPU 11 controls the operation of the LEDs 13A and 13B according to the value (x) of radio wave sensitivity of the wireless communication unit 15 (step S75). Here, the CPU 11 receives information on the value (x) of the radio wave sensitivity from the wireless communication unit 15. Next, the CPU 11 performs other process (step S76), and then the procedure returns to step S71.

Figure 12:
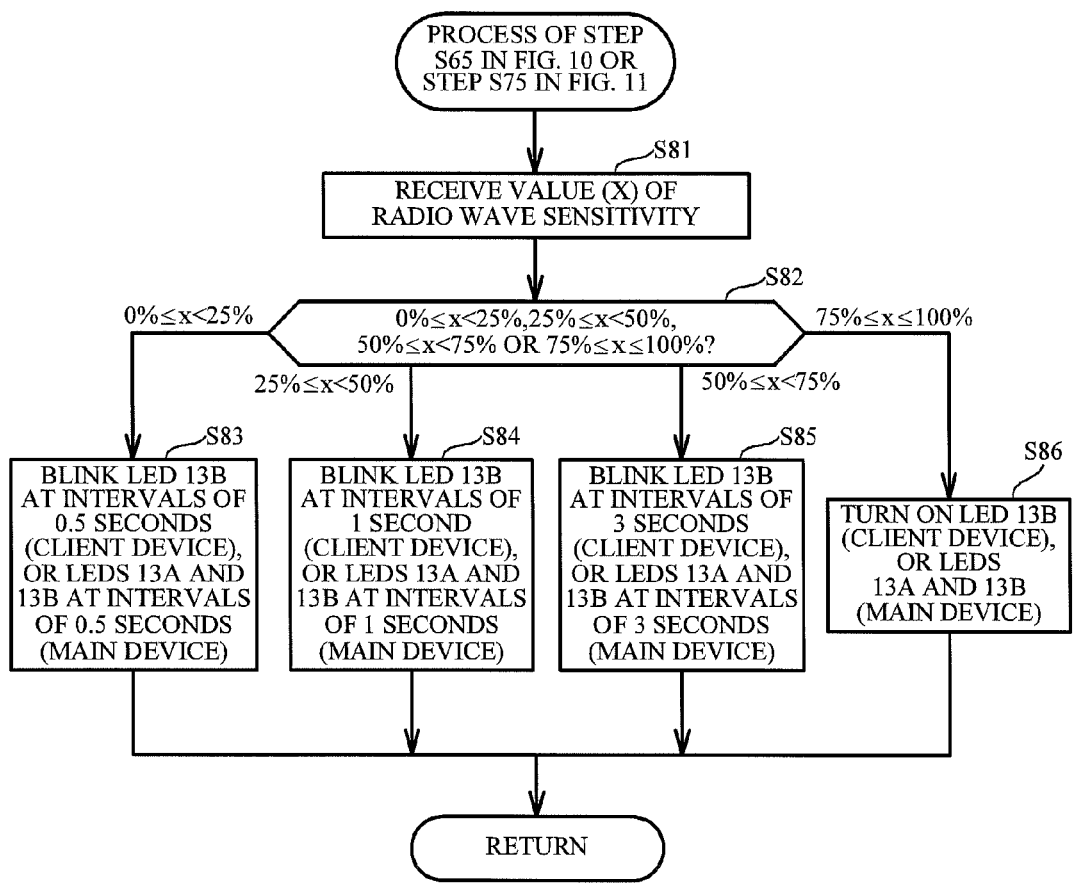
FIG. 12 is a flowchart illustrating a process of step S65 in FIG. 10 or step S75 in FIG. 11.

FIG. 12 is a flowchart illustrating a process of step S65 in FIG. 10 or step S75 in FIG. 11.

The CPU 11 receives information on the value (x) of the radio wave sensitivity from the wireless communication unit 15 (step S81). The CPU 11 determines whether the value (x) of the radio wave sensitivity corresponds to any of "$0\% \leq x < 25\%$", "$25\% \leq x < 50\%$", "$50\% \leq x < 75\%$" or "$75\% \leq x \leq 100\%$", for example (step S82). Here, the ranges of the radio wave sensitivity are not limited to these. For example, the range of the radio wave sensitivity may be divided into two or more.

When the value (x) of the radio wave sensitivity corresponds to "$0\% \leq x < 25\%$", the CPU 11 blinks the LED 13B at intervals of 0.5 seconds, for example when the dongle is the client device, or the LEDs 13A and 13B at intervals of 0.5 seconds, for example when the dongle is the main device (step S83).

When the value (x) of the radio wave sensitivity corresponds to "$25\% \leq x < 50\%$", the CPU 11 blinks the LED 13B at intervals of 1 second, for example when the dongle is the client device, or the LEDs 13A and 13B at intervals of 1 second, for example when the dongle is the main device (step S84).

When the value (x) of the radio wave sensitivity corresponds to "$50\% \leq x < 75\%$", the CPU 11 blinks the LED 13B at intervals of 3 seconds, for example when the dongle is the client device, or the LEDs 13A and 13B at intervals of 3 seconds, for example when the dongle is the main device (step S85).

When the value (x) of the radio wave sensitivity corresponds to "$75\% \leq x \leq 100\%$", the CPU 11 turns on the LED 13B for example when the dongle is the client device, or the LEDs 13A and 13B for example when the dongle is the main device (step S86).

Thus, the CPU 11 changes a lighting and blinking pattern of the LED 13B or the LEDs 13A and 13B according to the value (x) of the radio wave sensitivity, and hence the worker can comprehend the radio wave sensitivity of the dongle. The blinking intervals are not limited to the above-mentioned values. Although the blinking intervals are changed according to the value (x) of the radio wave sensitivity, blinking colors may be changed according to the value (x) of the radio wave sensitivity. When the dongle includes four or more LEDs, for example, a green LED emits light in the case of "0%≤x<25%", a blue LED emits light in the case of "25%≤x<50%", a white LED emits light in the case of "50%≤x<75%", and a yellow LED emits light in the case of "75%≤x≤100%".

Figure 13:
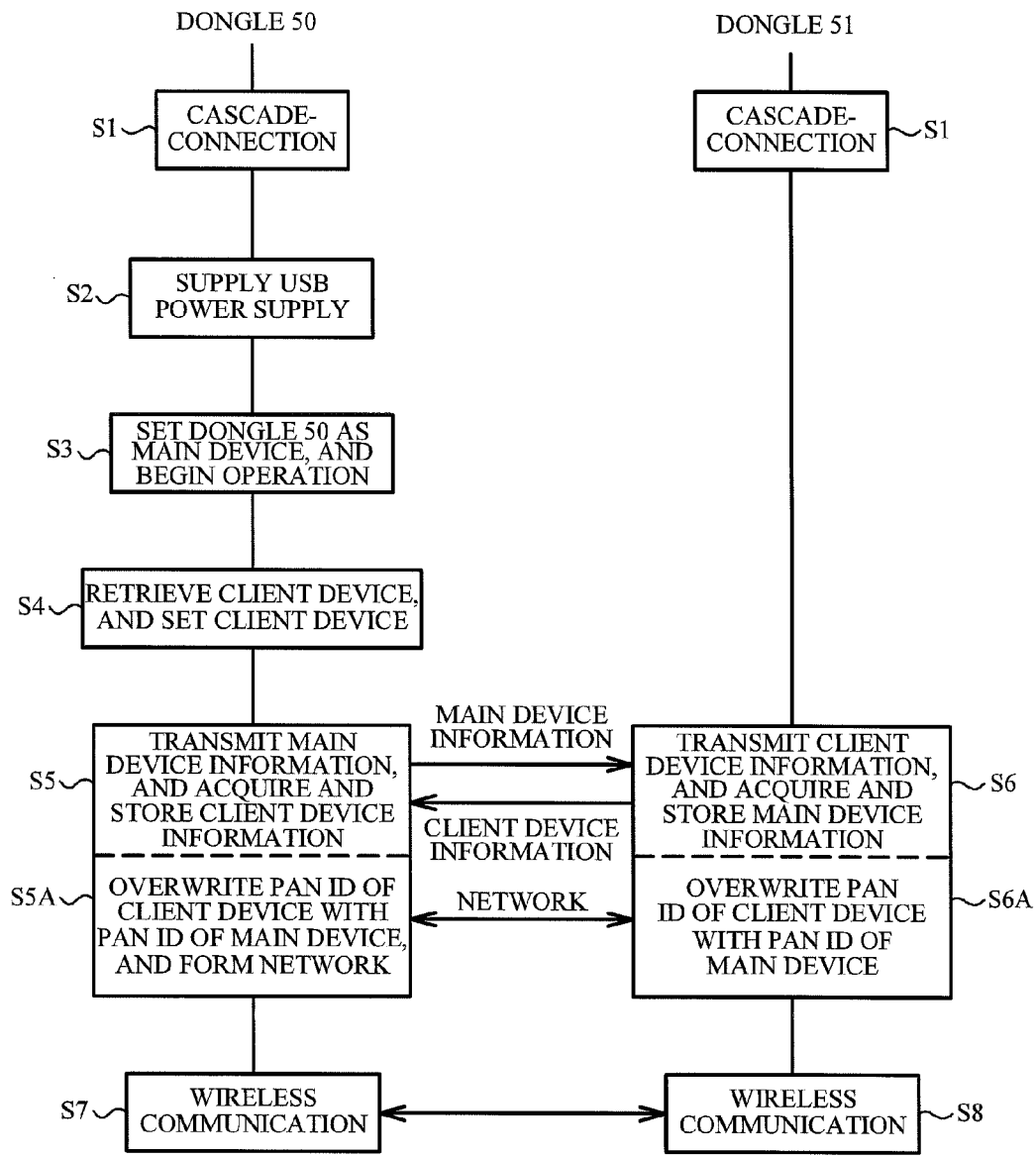
FIG. 13 is a sequence diagram illustrating a setting method of a relationship between the main device and the client device of the dongles.
Figure 14:
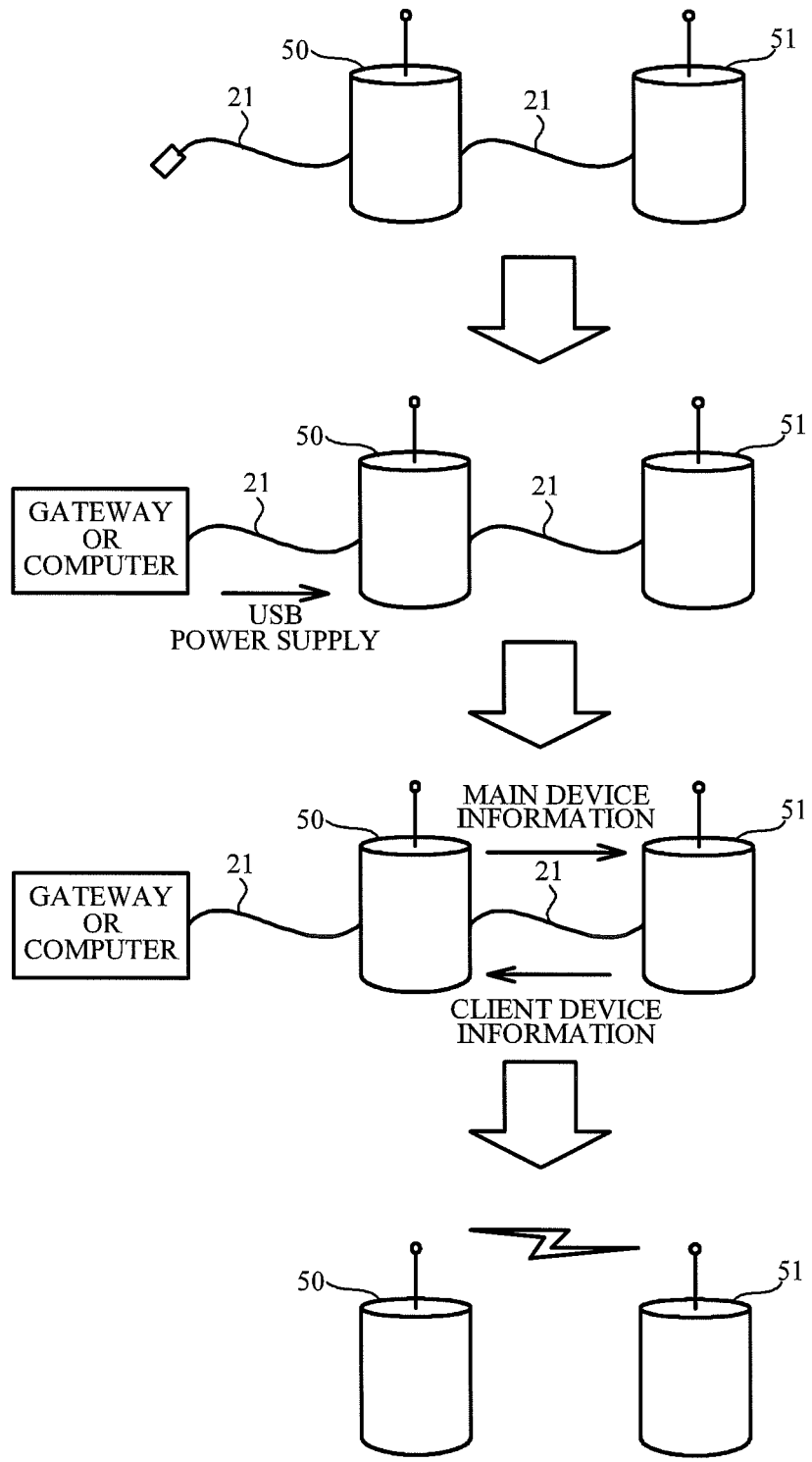
FIG. 14 is a schematic diagram illustrating the setting method of the relationship between the main device and the client device of the dongles.

FIG. 13 is a sequence diagram illustrating a setting method of a relationship between the main device and the client device of the dongles. FIG. 14 is a schematic diagram illustrating the setting method of the relationship between the main device and the client device of the dongles.

First, the USB function unit 16 of a dongle 51 is connected to the USB host unit 17 of a dongle 50 (step S1). In this case, the dongles 50 and 51 are cascade-connected to each other with the USB cable 21. Then, the USB function unit 16 of the dongle 50 is connected to a USB terminal of the gateway 2 or the computer, not shown, via the USB cable 21, and the USB power supply is supplied to the dongle 50 (step S2). At this time, the CPU 11 of the dongle 50 sets the dongle 50 as the main device 4, sets the dongle 51 as a controllable USB host, and begins the operation (step S3). At this time, the USB host unit 17 of the dongle 50 needs to function as a power supply source for the dongle 51, but does not need to have a USB function.

Next, when the dongle 50 begins the operation as a USB host, the CPU 11 of the dongle 50 retrieves a dongle connected to the USB host unit 17, finds the dongle 51, and sets the dongle 51 as the USB device, i.e., the client device 5 (step S4). Then, the CPU 11 of the dongle 50 transmits the main device information stored into the non-volatile ROM 18 of the dongle 50 to the dongle 51 as a USB command, acquires the client device information stored into the non-volatile ROM 18 of the dongle 51 from the dongle 51 as a USB command and stores the USB command into the non-volatile ROM 18 of the dongle 50 (step S5). On the other hand, the CPU 11 of the dongle 51 transmits the client device information stored into the non-volatile ROM 18 of the dongle 51 to the dongle 50 as a USB command, acquires the main device information stored into the non-volatile ROM 18 of the dongle 50 from the dongle 50 as a USB command and stores the USB command into the non-volatile ROM 18 of the dongle 51 (step S6). The relationship of the wireless communication between the main device and the client device is constructed by transmitting and receiving the main device information and the client device information in steps S5 and S6.

For example, the wireless communication between the dongles 50 and 51 adopts a system of IEEE802.15.4. In this case, the main device information is the PAN (Personal Area Network) ID and the address of the dongle 50, and the client device information is the PAN ID and the address of the dongle 51. In the system of IEEE802.15.4, when the PAN IDs of the packets which the main device and the client device transmit are not identical with each other, the main device and the client device cannot communicate wirelessly with each other.

Therefore, in step S5, when the CPU 11 of the dongle 50 acquires the PAN ID and the address of the dongle 51 from the dongle 51 as the client device information, the CPU 11 of the dongle 50 overwrites, i.e., updates the PAN ID of the dongle 51 with the PAN ID of the dongle 50, and stores the updated PAN ID into the non-volatile ROM 18. Moreover, the CPU 11 of the dongle 50 forms a network to which the dongles 50 and 51 belong by using the PAN ID of the dongle 50 (step S5A). On the other hand, in step S6, when the CPU 11 of the dongle 51 acquires the PAN ID and the address of the dongle 50 from the dongle 50 as the main device information, the CPU 11 of the dongle 51 overwrites, i.e., updates the PAN ID of the dongle 51 with the PAN ID of the dongle 50, and stores the updated PAN ID into the non-volatile ROM 18 (step S6A). Thereby, the PAN IDs of a transmission source and a transmission destination included in the packets transmitted and received between the dongles 50 and 51 are identical with each other, and hence the dongles 50 and 51 can communicate wirelessly with each other.

When the dongle 51 is disconnected from the dongle 50 after step S5A, the wireless communication unit 15 of the dongle 50 communicates wirelessly with the dongle 51 by using the addresses of the dongles 50 and 51 and the PAN ID of the dongle 50 (step S7). When the dongle 51 is disconnected from the dongle 50 after step S6A, the wireless communication unit 15 of the dongle 51 communicates wirelessly with the dongle 50 by using the addresses of the dongles 50 and 51 and the PAN ID of the dongle 50 (step S8). Both of the PAN IDs of the transmission source and the transmission destination are the PAN ID of the dongle 50 by the update of steps S5A and S6A.

Here, an example in which two dongles are cascade-connected to each other is described, but three or more dongles may be cascade-connected to each other, for example. When three dongles are cascade-connected to each other, for example, three dongles are the main device, the client device and a sub-client device. That is, the client device functions as a main device of the sub-client device. The wireless communication between the dongles 50 and 51 is not limited to the system of IEEE802.15.4, but the system of IEEE802.11 may be used for the wireless communication.

A description will now be given of a case where the dongle 50 is used as the main device 4 and the dongle 51 is used as the client device 5, as illustrated in FIG. 1.

The dongle 51 (i.e., the client device 5) connects the smart outlet 6 as the USB device, acquires data on the electric power consumption of the smart outlet 6, and transmits the data on the electric power consumption of the smart outlet 6 to the dongle 50 (i.e., the main device 4) by wireless communication. The dongle 50 acquires the data on the electric power consumption of the smart outlet 6 from the dongle 51, and transmits the data to the gateway 2. When data is transmitted from the gateway 2 to the smart outlet 6, the dongle 50 acquires the data from the gateway 2 and transmits the data to the dongle 51 by the wireless communication. The dongle 51 acquires the data from the dongle 50 and transmits the data to the smart outlet 6.

As described above, the CPU 11 decides the operation mode of the dongle as any one of the main device mode or the client device mode according to the type of the operating power supply of the dongle. In addition, the CPU 11 sets the relationship between the main device and the client device of the dongles by cascade-connecting the dongles to each other and receiving the power supply.

Therefore, there is a case where the operation mode of the dongle decided according to the type of the operating power supply is different from the set relationship between the main device and the client device at the time of the cascade-connection. For example, this case corresponds to a case where the AC-DC adapter cable 22 in which the operation mode becomes the client device mode is connected to the dongle set as the main device mode at the time of the cascade-connection, or a case where the USB cable 21 in which the operation mode becomes the main device mode is connected to the dongle set as the client mode at the time of the cascade-connection.

In this case, the CPU 11 may decide whether to give priority to any one of the setting of the main device or the client device at the time of the cascade-connection and the operation mode decided according to the type of the operating power supply, depending on the setting of the setting switch 14 or the input from the computer, not shown. For example, when the CPU 11 gives priority to the decided operation mode of the dongle over the setting of the main device or the client device at the time of the cascade-connection, the CPU 11 neglects the setting of the main device at the time of the cascade-connection and actuates the dongle as the client device if the AC-DC adapter cable 22 is connected to the dongle set as the main device at the time of the cascade-connection.

When the decided operation mode of the dongle is different from the setting of the main device or the client device at the time of the cascade-connection, the CPU 11 may turn on the LED 13A or the LED 13B in a light emitting color and/or at blinking intervals different from a light emitting color and/or blinking intervals when the decided operation mode of the dongle is identical with the setting of the main device or the client device at the time of the cascade-connection. The CPU 11 further may notify the worker that the decided operation mode of the dongle is different from the setting of the main device or the client device at the time of the cascade-connection. Thereby, the worker can recognize a mistake about the type of the cable to be connected, or a mistake about the setting of the main device or the client device at the time of the cascade-connection.

In addition, when the decided operation mode of the dongle is different from the setting of the main device or the client device at the time of the cascade-connection, the worker may change the type of the cable, or reset the relationship between the main device and the client device of the dongles.

Each CPU 11 of the dongles 50 and 51 may store the set main device information and the set client device information into the non-volatile ROM 18 as history information.

Figure 15:
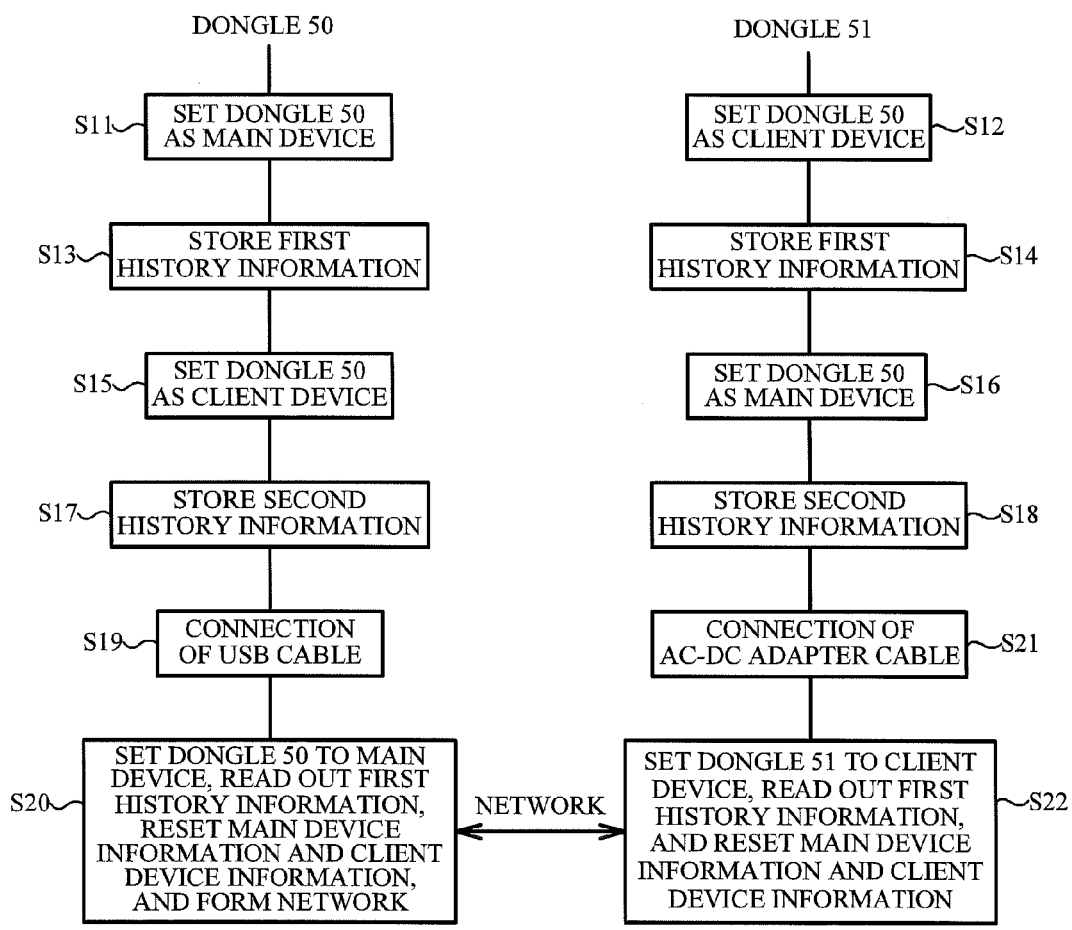
FIG. 15 is a sequence diagram illustrating processes performed by the dongle and another dongle.

FIG. 15 is a sequence diagram illustrating processes performed by the dongles 50 and 51. For example, when the dongle 50 is set as the main device and the dongle 51 is set as the client device (steps S11 and S12), the CPU 11 of the dongle 50 stores the main device information and the client device information into the non-volatile ROM 18 of the dongle 50 as first history information (step S13), and the CPU 11 of the dongle 51 stores the main device information and the client device information into the non-volatile ROM 18 of the dongle 51 as first history information (step S14).

Then, when the dongle 50 is set as the client device and the dongle 51 is set as the main device (steps S15 and S16), the CPU 11 of the dongle 50 stores the main device information and the client device information into the non-volatile ROM 18 of the dongle 50 as second history information (step S17), and the CPU 11 of the dongle 51 stores the main device information and the client device information into the non-volatile ROM 18 of the dongle 51 as second history information (step S18).

Then, when the dongle 50 (the client device) is disconnected from the dongle 51 (the main device), and the USB cable 21 in which the operation mode becomes the main device mode is connected to the dongle 50 (step S19), the CPU 11 of the dongle 50 sets the operation mode of the dongle 50 to the main device mode, reads out the first history information from the non-volatile ROM 18 of the dongle 50, resets the main device information and the client device information of the first history information as current main device information and current client device information, and forms a network with the client device (here, the dongle 51) corresponding to the client device information of the first history information (step S20). On the other hand, when the AC-DC adapter cable 22 in which the operation mode becomes the client device mode is connected to the dongle 51 (step S21), the CPU 11 of the dongle 51 sets the operation mode to the client mode, reads out the first history information from the non-volatile ROM 18 of the dongle 51, and resets the main device information and the client device information of the first history information as current main device information and current client device information (step S22). Thereby, the dongle 50 as the main device can communicate wirelessly with the dongle 51, and the dongle 51 as the client device can communicate wirelessly with the dongle 50.

Therefore, once the relationship between the main device and the client device of the dongles 50 and 51 is constructed, even when the relationship between the main device and the client device is changed, it is possible to restore the changed relationship between the main device and the client device to its original state by connecting appropriate cables to the dongles 50 and 51.

In the above-mentioned embodiment, an interface that transmits and receives various data including the main device information and the client device information and supplies the power supply is the USB terminal, but the interface is not limited to this. An interface to be mounted on each of the main device and the client device may be any suitable interface having a data transmission and reception function and a power supply supplying function. For example, a HDMI (High-Definition Multimedia Interface) terminal may be used as the interface.

As described above, according to the present embodiment, when the worker connects a dongle to another dongle, the dongle is automatically set to the main device or the client device according to a supply source of the power supply, and the PAN ID necessary for the wireless communication is updated. Therefore, it is possible to prevent a setting mistake of the pairing relationship between the main device and the client device and to easily set the pairing relationship between the main device and the client device.

(Second Embodiment) In the first embodiment, the dongles 50 and 51 are cascade-connected to each other, the dongle 50 to which the USB power supply is supplied from the gateway or the computer, not shown, is set as the main device, and the dongle 51 connected to the dongle 50 via the USB terminal is set as the client device, as illustrated in FIGS. 13 and 14. The second embodiment explains a case where, when the dongle 51 is connected to the dongle 50 which is operating as the client device, the dongle 51 is set as the main device of the dongle 50 and the dongle 50 is set as the client device of the dongle 51.

Since the configuration of the dongle of the present embodiment is the same as that of the dongle of the first embodiment, a description thereof is omitted. The CPU 11 functions as a setting portion and an update portion. The wireless communication unit 15 functions as a wireless communication portion, and the USB function unit 16 and the USB host unit 17 function as a connection portion. The non-volatile ROM 18 functions as a storage portion.

Figure 16:
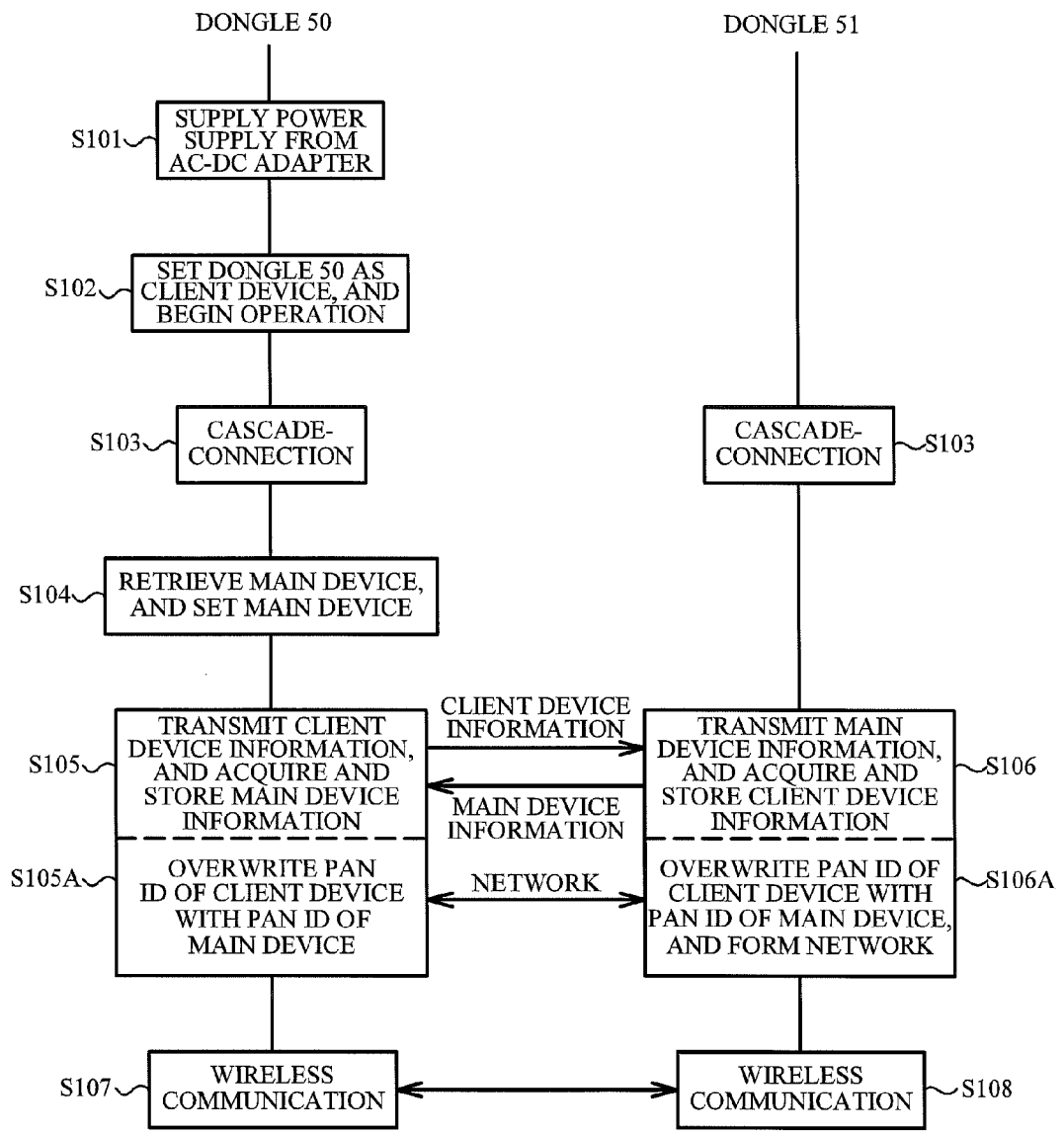
FIG. 16 is a sequence diagram illustrating the setting method of the relationship between the main device and the client device of the dongles according to a second embodiment.
Figure 17:
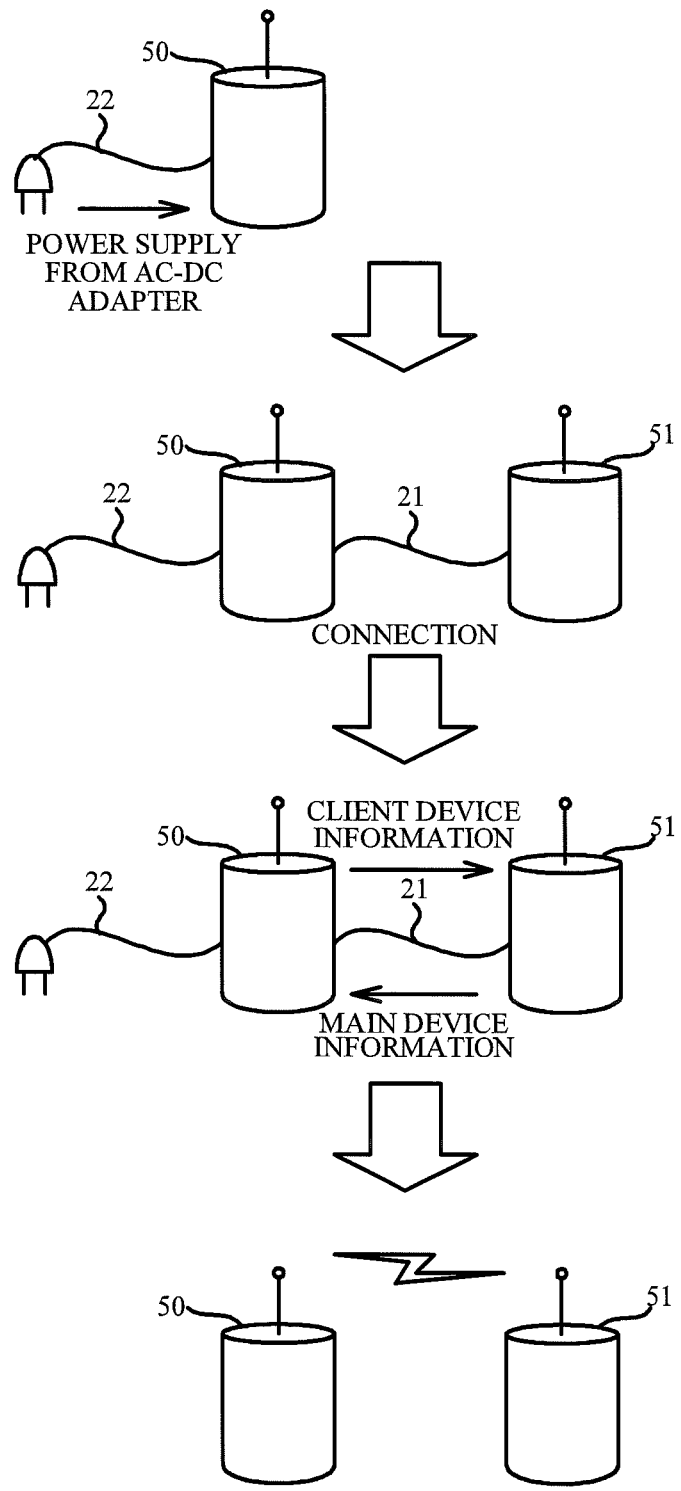
FIG. 17 is a schematic diagram illustrating the setting method of the relationship between the main device and the client device of the dongles.

FIG. 16 is a sequence diagram illustrating the setting method of the relationship between the main device and the client device of the dongles according to the second embodiment. FIG. 17 is a schematic diagram illustrating the setting method of the relationship between the main device and the client device of the dongles.

First, the AC-DC adapter cable 22 is connected to the DC input terminal 23 of dongle 50, and the dongle 50 receives the power supply from the AC-DC adapter (step S101). At this time, the CPU 11 of the dongle 50 sets the dongle 50 as the main device 4, and begins the operation as the client device mode (step S102).

Next, the USB function unit 16 of the dongle 51 is connected to the USB host unit 17 of the dongle 50 (step S103). At this time, the dongles 50 and 51 are cascade-connected to each other with the USB cable 21. Next, when the dongle 50 is cascade-connected to the dongle 51, the CPU 11 of the dongle 50 retrieves a dongle connected to the USB host unit 17, finds the dongle 51, and sets the dongle 51 as the USB host, i.e., the main device 4 (step S104).

Then, the CPU 11 of the dongle 50 transmits the client device information stored into the non-volatile ROM 18 of the dongle 50 to the dongle 51 as a USB command, acquires the main device information stored into the non-volatile ROM 18 of the dongle 51 from the dongle 51 as a USB command and stores the USB command into the non-volatile ROM 18 of the dongle 50 (step S105). On the other hand, the CPU 11 of the dongle 51 transmits the main device information stored into the non-volatile ROM 18 of the dongle 51 to the dongle 50 as a USB command, acquires the client device information stored into the non-volatile ROM 18 of the dongle 50 from the dongle 50 as a USB command and stores the USB command into the non-volatile ROM 18 of the dongle 51 (step S106). The relationship of the wireless communication between the main device and the client device is constructed by transmitting and receiving the main device information and the client device information in steps S105 and S106.

In step S105, when the CPU 11 of the dongle 50 acquires the PAN ID and the address of the dongle 51 from the dongle 51 as the main device information, the CPU 11 of the dongle 50 overwrites, i.e., updates the PAN ID of the dongle 50 with the PAN ID of the dongle 51, and stores the updated PAN ID into the non-volatile ROM 18 (step S105A). On the other hand, in step S106, when the CPU 11 of the dongle 51 acquires the PAN ID and the address of the dongle 50 from the dongle 50 as the client device information, the CPU 11 of the dongle 51 overwrites, i.e., updates the PAN ID of the dongle 50 with the PAN ID of the dongle 51, and stores the updated PAN ID into the non-volatile ROM 18. Moreover, the CPU 11 of the dongle 51 forms a network to which the dongles 50 and 51 belong by using the PAN ID of the dongle 51 (step S106A). Thereby, the PAN IDs of a transmission source and a transmission destination included in the packets transmitted and received between the dongles 50 and 51 are identical with each other, and hence the dongles 50 and 51 can communicate wirelessly with each other.

When the dongle 51 is disconnected from the dongle 50 after step S105A, the wireless communication unit 15 of the dongle 50 communicates wirelessly with the dongle 51 by using the addresses of the dongles 50 and 51 and the PAN ID of the dongle 51 (step S107). When the dongle 51 is disconnected from the dongle 50 after step S106A, the wireless communication unit 15 of the dongle 51 communicates wirelessly with the dongle 50 by using the addresses of the dongles 50 and 51 and the PAN ID of the dongle 50 (step S108). Both of the PAN IDs of the transmission source and the transmission destination are the PAN ID of the dongle 51 by the update of steps S105A and S106A.

Here, an example in which two dongles are cascade-connected to each other is described, but three or more dongles may be cascade-connected to each other, for example. When three dongles are cascade-connected to each other, for example, three dongles are the main device, the client device and a sub-client device. That is, the client device functions as a main device of the sub-client device. The wireless communication between the dongles 50 and 51 is not limited to the system of IEEE802.15.4, but the system of IEEE802.11 may be used for the wireless communication.

Figure 18:
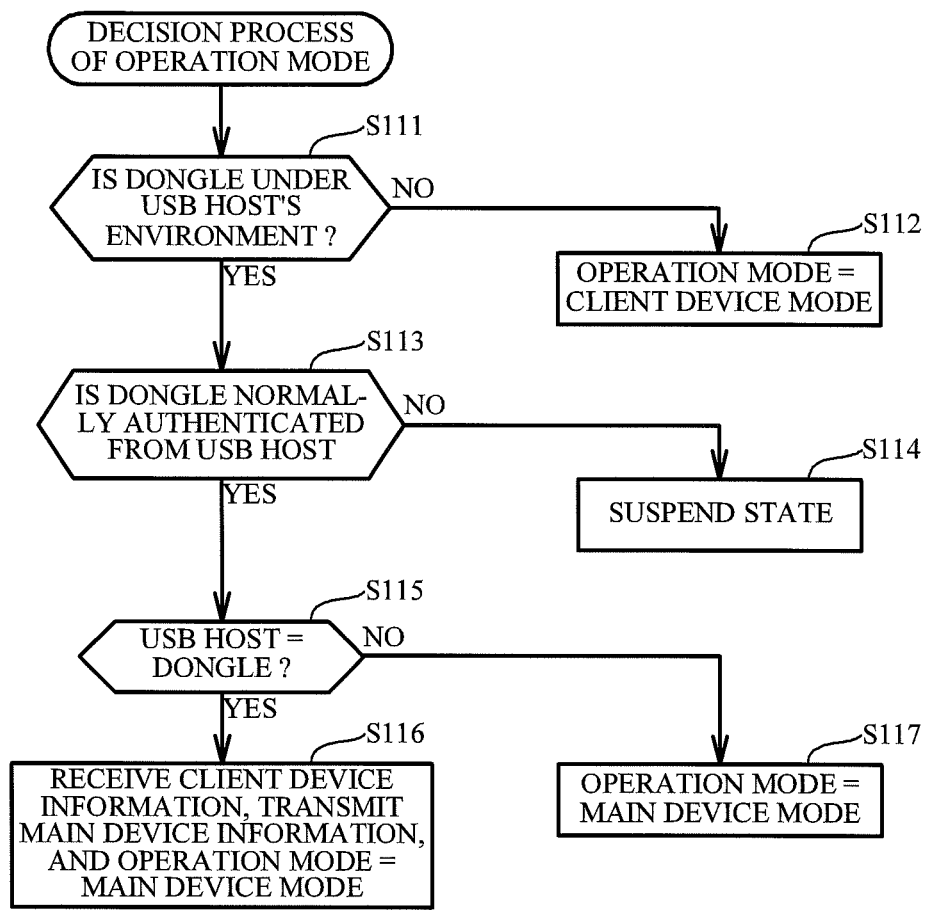
FIG. 18 is a flowchart illustrating a decision process of an operation mode of the dongle.

FIG. 18 is a flowchart illustrating a decision process of the operation mode of the dongle. The decision process of the operation mode is a process for deciding whether the operational mode of each dongle is the main device mode or the client device mode. The decision process of the operation mode is performed by the CPU 11 of each dongle.

First, the CPU 11 of the dongle determines whether the dongle is under a USB host's environment, i.e., the dongle is operating with the USB power supply as a USB guest (step S111). When the USB function unit 16 receives the USB power supply, the CPU 11 can determine that the dongle is operating with the USB power supply as the USB guest.

When the dongle is not under the USB host's environment, i.e., the dongle is operating with the power supply from the AC-DC adapter (NO of step S111), the CPU 11 of the dongle sets the operation mode to the client device mode (step S112). Thus, when the dongle operates independently as the client device and another dongle is connected to the dongle of the client device, the another dongle transmits and receives the main device information and the client device information with the dongle of the client device according to the present flowchart. Moreover, when a device to be controlled such as the smart outlet 6 is connected to the dongle of the client device, the dongle of the client device performs control operation. When a device to be not controlled is connected to the dongle of the client device, the dongle of the client device neglects the uncontrolled device without authentication of the uncontrolled device.

On the other hand, when the dongle is under the USB host's environment (YES of step S111), the CPU 11 determines whether the dongle is normally authenticated from the USB host (step S113). Here, the USB host indicates a USB device located upstream of the dongle, i.e., a USB device which supplies the power supply to the dongle. When the CPU 11 receives a response to the authentication decided by USB standards from the USB host, the CPU 11 determines that the dongle is normally authenticated as a USB guest from the USB host.

When the dongle is not normally authenticated from the USB host (NO of step S113), the CPU 11 sets the operation mode to a suspend state (step S114). In this case, the dongle cannot be used as the main device and the client device. When the dongle is normally authenticated from the USB host (YES of step S113), the CPU 11 determines whether the USB host is a dongle (step S115). For example, the CPU 11 can determine whether the USB host is the dongle by whether the PAN ID is received from the USB host. When the PAN ID is received from the USB host, the USB host is the dongle.

When the USB host is the dongle (YES of step S115), the CPU 11 transmits the main device information (i.e., the PAN ID and the address) stored into the non-volatile ROM 18 to the USB host, receives the client device information (i.e., the PAN ID and the address) from the USB host, stores the client device information into the non-volatile ROM 18, and sets the operation mode to the main device mode (step S116). When the USB host is not the dongle, i.e., the gateway, the computer, or the like (NO of step S115), the CPU 11 sets the operation mode to the main device mode (step S117).

According to the present embodiment, the CPU 11 can decide the operation mode of the dongle according to whether the dongle is under the USB host's environment, i.e., the dongle is operating with the USB power supply as the USB guest.

In the present embodiment, when the USB function unit 16 of the dongle 51 is connected to the USB host unit 17 of the dongle 50 which is operating as the client device, the dongle 51 is set to the main device of the dongle 50 and the dongle 50 is set to the client device of the dongle 51. Therefore, the USB host unit 17 of the main device (i.e., the dongle 51) is required for connection with the gateway or the computer, not shown, but it is not necessarily required for transmission and reception of the main device information and the client device information. Accordingly, the main device needs to have the single USB host unit 17, but does not need to have two or more USB host units 17. As a result, the main device of the present embodiment can reduce cost of manufacturing by reducing the number of USB host units 17, compared to the main device of the first embodiment.

In the first and second embodiments, the client device 5 connects the smart outlet 6 as the USB device, acquires the data on the electric power consumption of the smart outlet 6, and transmits the data on the electric power consumption of the smart outlet 6 to the main device 4 by wireless communication. At this time, the client device 5 may process the data on the electric power consumption according to given conditions, and may store the data on the electric power consumption for a definite period of time. A method for transmitting the data on the electric power consumption from the client device 5 to the main device 4 may be a method in which the main device 4 inquires of all the client devices 5 the transmission of the data on the electric power consumption in sequence, or a method in which only the client device 5 which first has accessed the main device 4 transmits the data on the electric power consumption to the main device 4. Both of the methods are realizable as long as the main device information and the client device information are transmitted and received between the dongles as described above and the relationship between the main device and the client device can be constructed.

In the present embodiment, an interface that transmits and receives various data including the main device information and the client device information and supplies the power supply is the USB terminal, but the interface is not limited to this. For example, a HDMI (High-Definition Multimedia Interface) terminal may be used as the interface. In the present embodiment, the light emitting color of the LED and/or the blinking intervals of the LED may be controlled, as is the case with the first embodiment. For example, the light emitting color of the LED and/or the blinking intervals of the LED may be controlled according to the value of the radio wave sensitivity, as illustrated in FIG. 12.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication device comprising:
    a storage that stores first identification information for identifying a communication device and second identification information for identifying a network to which the communication device belongs;
    a connection portion that connects with another communication device by a cable;
    a first setting portion that sets the communication device as a main device when the communication device is connected to the another communication device and receives an electric power from a first external power supply, and sets the communication device as a client device when the communication device is connected to the another communication device and receives an electric power from the another communication device;
    an update portion that transmits the first identification information and the second identification information to the another communication device, receives from the another communication device third identification information for identifying the another communication device and fourth identification information for identifying a network to which the another communication device belongs, forms a network to which the communication device and the another communication device belong with the second identification information when the communication device is set as the main device, and updates the second identification information with the received fourth identification information when the communication device is set as the client device; and
    a wireless communication portion that, when the another communication device is disconnected from the communication device, communicates wirelessly with the another communication device with the first identification information, the third identification information and any one of the second identification information and the fourth identification information.

2. The communication device according to claim 1, wherein when the another communication device is disconnected from the communication device, the communication device receives an electric power from any one of the first external power supply or a second external power supply,
    a first cable connected between the communication device and the first external power supply and a second cable connected between the communication device and the second external power supply are different types of cables, and
    the communication device further comprises a second setting portion that sets the communication device to the main device when the communication device receives the electric power from the first external power supply, and sets the communication device to the client device when the communication device receives the electric power from the second external power supply.

3. The communication device according to claim 2, wherein when the first setting portion sets the main device and the client device, the storage stores the first identification information, the second identification information, the third identification information and the fourth identification information as history information,
    when the communication device receives the electric power from the first external power supply after the setting of the main device and the client device is changed, the second setting portion sets the communication device to the main device, and the update portion reads out the history information from the storage and forms the network to which the communication device and the another communication device belong with the second identification information, and
    when the communication device receives the electric power from the second external power supply after the setting of the main device and the client device is changed, the second setting portion sets the communication device to the client device, and the update portion reads out the history information from the storage.

4. The communication device according to claim 2, further comprising a light emitting portion that, when the setting of the main device and the client device by the first setting portion is different from the setting of the main device and the client device by the second setting portion, emits light in a color and/or at blinking intervals which are different from a color and/or blinking intervals when the setting of the main device and the client device by the first setting portion is the same as the setting of the main device and the client device by the second setting portion.

5. The communication device according to claim 2, further comprising a light emitting portion that emits light in a different color and/or at different blinking intervals according to whether the setting of the communication device is the main device or the client device.

6. The communication device according to claim 2, wherein when the communication device receives the electric power from any one of the first external power supply and the second external power supply and cannot communicate wirelessly with the another communication device, the light emitting portion emits light in a color and/or at blinking intervals which are different from a color and/or blinking intervals when the communication device communicates wirelessly with the another communication device.

7. The communication device according to claim 2, wherein the first external power supply is a USB power supply, and the second external power supply is a power supply supplied from an alternating-current and direct-current adapter.

8. The communication device according to claim 1, wherein the wireless communication portion calculates a value of radio wave sensitivity concerning a radio wave received from the another communication device, and the communication device further comprises a light emitting portion that emits light in a different color and/or at different blinking intervals according to the calculated value of the radio wave sensitivity.

9. The communication device according to claim 1, wherein when at least one of the first identification information, the second identification information, the third identification information and the fourth identification information is changed, the storage stores information which specifies the changed day and time.

10. A communication device comprising:
a storage that stores first identification information for identifying a communication device and second identification information for identifying a network to which the communication device belongs;
a connection portion that connects with another communication device by a cable;
a setting portion that sets the communication device as a client device when the communication device receives an electric power from an external power supply, and sets the communication device as a main device when the communication device is connected to another communication device and receives an electric power from the another communication device;
an update portion that transmits the first identification information and the second identification information to the another communication device, receives from the another communication device third identification information for identifying the another communication device and fourth identification information for identifying a network to which the another communication device belongs, forms a network to which the communication device and the another communication device belong with the second identification information when the communication device is set as the main device, and updates the second identification information with the received fourth identification information when the communication device is set as the client device; and
a wireless communication portion that, when the another communication device is disconnected from the communication device, communicates wirelessly with the another communication device with the first identification information, the third identification information and any one of the second identification information and the fourth identification information.

11. The communication device according to claim 10, wherein the setting portion sets the communication device as the main device when the communication device receives the electric power from a USB device or a HDMI device, and sets the communication device as the client device when the communication device receives the electric power from a device other than the USB device and the HDMI device.

12. The communication device according to claim 11, wherein the setting portion sets the communication device to a suspend state when the communication device receives the electric power from the USB device or the HDMI device and is not normally authenticated from the USB device or the HDMI device.

13. A method for controlling a communication device, comprising:
setting the communication device as a main device when the communication device is connected to another communication device and receives an electric power from a first external power supply;
setting the communication device as a client device when the communication device is connected to the another communication device and receives an electric power from the another communication device;
transmitting the first identification information for identifying the communication device and the second identification information for identifying a network to which the communication device belongs to the another communication device;
receiving from the another communication device third identification information for identifying the another communication device and fourth identification information for identifying a network to which the another communication device belongs;
forming a network to which the communication device and the another communication device belong with the second identification information when the communication device is set as the main device;
updating the second identification information with the received fourth identification information when the communication device is set as the client device; and
communicating wirelessly with the another communication device with the first identification information, the third identification information and any one of the second identification information and the fourth identification information when the another communication device is disconnected from the communication device.

14. A method for controlling a communication device, comprising:
setting the communication device as a client device when the communication device receives an electric power from an external power supply
setting the communication device as a main device when the communication device is connected to another communication device and receives an electric power from the another communication device;

transmitting the first identification information for identifying the communication device and the second identification information for identifying a network to which the communication device belongs to the another communication device;

receiving from the another communication device third identification information for identifying the another communication device and fourth identification information for identifying a network to which the another communication device belongs;

forming a network to which the communication device and the another communication device belong with the second identification information when the communication device is set as the main device;

updating the second identification information with the received fourth identification information when the communication device is set as the client device; and communicating wirelessly with the another communication device with the first identification information, the third identification information and any one of the second identification information and the fourth identification information when the another communication device is disconnected from the communication device.

* * * * *

UNITED STATES PATENT AND TRADEMARK OFFICE
CERTIFICATE OF CORRECTION

| | |
|---|---|
| PATENT NO. | : 8,818,279 B2 |
| APPLICATION NO. | : 13/599154 |
| DATED | : August 26, 2014 |
| INVENTOR(S) | : Naoyuki Nagao |

It is certified that error appears in the above-identified patent and that said Letters Patent is hereby corrected as shown below:

In the Claims

Column 17, Line 16, In Claim 6, delete "claim 2," and insert -- claim 5, --, therefor.

Signed and Sealed this
Eighteenth Day of November, 2014

Michelle K. Lee
*Deputy Director of the United States Patent and Trademark Office*